United States Patent
McDaniel (10) Patent No.: US 9,426,281 B1
(45) Date of Patent: Aug. 23, 2016

(54) AUTOMATIC CALLING LIST SCHEDULER

(71) Applicant: Noble Systems Corporation, Atlanta, GA (US)

(72) Inventor: Patrick M. McDaniel, Atlanta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 263 days.

(21) Appl. No.: 14/018,809

(22) Filed: Sep. 5, 2013

(51) Int. Cl.
*H04M 3/00* (2006.01)
*H04M 5/00* (2006.01)
*H04M 3/22* (2006.01)
*H04M 3/51* (2006.01)

(52) U.S. Cl.
CPC ............. *H04M 3/22* (2013.01); *H04M 3/5158* (2013.01)

(58) Field of Classification Search
CPC ..................................................... H04M 3/5158
USPC ........................................ 379/266.07–266.08
See application file for complete search history.

(56) References Cited

U.S. PATENT DOCUMENTS

| | | | | |
|---|---|---|---|---|
| 7,502,460 | B2 * | 3/2009 | Rodenbusch et al. | 379/266.07 |
| 8,989,370 | B1 * | 3/2015 | Howell et al. | 379/266.07 |
| 2005/0002515 | A1 * | 1/2005 | Mewhinney et al. | 379/266.08 |
| 2007/0172050 | A1 * | 7/2007 | Weinstein et al. | 379/266.07 |
| 2011/0116618 | A1 * | 5/2011 | Zyarko et al. | 379/266.07 |
| 2013/0136248 | A1 * | 5/2013 | Kaiser-Nyman et al. | 379/216.01 |

OTHER PUBLICATIONS

Nobles Systems Corporation, Maestro 2010.4.1 User Manual, vol. 1, Jan. 11, 2012, 486 Pages, Noble Systems Corporation, Atlanta, GA 30319.
Nobles Systems Corporation, Maestro 2010.4.1 User Manual, vol. 2, Jul. 19, 2011, 422 Pages, Noble Systems Corporation, Atlanta, GA 30319.

* cited by examiner

*Primary Examiner* — Nafiz E Hoque (57) ABSTRACT

An automatic list scheduling ("ALS") system monitors usage of calling lists by an administrator where the administrator terminates usage of a calling list based on various measured parameters. The ALS system is configure to learn the conditions associated with the measured parameters and, in one embodiment, recommends to the administrator when to terminate use of a current calling list in favor of another list. A learning mode gathers various samples of the measured parameters associated with calling lists, and analyzes the sample to determine a threshold value. Upon monitoring the measured values for subsequent usage of calling lists, the current measured parameters are compared to the threshold value to determine whether to generate a recommendation to the administrator. In one embodiment, the time zone of the called party and the applicable calling window is used to determine whether the current list can continued to be used.

20 Claims, 7 Drawing Sheets

AUTOMATIC CALLING LIST SCHEDULER

BACKGROUND

Contact centers may originate communications, such as telephone calls, for various purposes. Telecommunications equipment commonly referred to as a "dialer" has the capability to originate a large number of telephone calls to various called parties and connect answered calls to available agents. A dialer is designed to keep the workforce of agents engaged in calls answered by called parties, as opposed to, e.g., answering machines.

The dialer processes a list of numbers to automatically dial, and upon detecting various conditions, the dialer may abandon the call and attempt to originate another call. For example, calls may be abandoned by the dialer upon reaching a no-answer condition, telephone number disconnected indication, out-of-service indication, or calls that are answered by an answering machine or voice-mail system. In each case, there is no party for the agent to talk to. Thus, it is possible for the dialer to originate a number of calls in order for the available agent to speak with a party. Once a called party answers, that call can be connected to an available agent.

Contact centers may handle outgoing call campaigns for various purposes. Contact centers may have campaigns for debt collection, conducting surveys, soliciting donations, and telemarketing. Each of these campaigns may be associated with one or more calling lists, which are lists of telephone numbers to be called. For example, a political survey campaign may have a corresponding set of calling lists, which are called at different times and pertain to different elections. Depending on the campaign, such as a survey for a national election, the calling list may be national in scope and cover a number of time zones.

When dialing numbers using a particular calling list, various factors may impact the success rate of the campaign. In one case, success can be a measure of the percentage of time agents are utilized in talking with called parties, as opposed to waiting to talk. In some instances, it may be necessary to switch from using one calling list to another to ensure that agents are being efficiently utilized. Determining when the appropriate time to switch a calling list can require significant experience. If a list is encountering poor performance (e.g., agents are not fully utilized), it may be due to some exigent circumstance that warrants suspending use of the calling list and starting another, or it may be due to normal fluctuations that do not warrant suspending the calling list.

Thus, it is desirable to have an automatic mechanism that provides a flexible and accurate determination of when to switch a calling list in a contact center to ensure that agent productivity is maximized. It is further desirable that such mechanisms are easy to administer and flexible to operate.

BRIEF SUMMARY

In general, embodiments of the present invention pertain to processing a calling list and switching to another calling list when conditions are appropriate. Determining the appropriate conditions, in one embodiment, is based on observing an administrator manually switching out a first calling list for a second calling list. In this mode, referred to as a learning mode, the system observes one or more measured parameters and determines the basis for swapping the calling list. In a control mode, the system then monitors the measured parameters, and applies the basis to the currently used calling list. The system then recommends terminating the currently used calling list or actually swaps the currently used calling list for another calling list when appropriate.

In various embodiments, the measured parameters may comprise one or more of: time, call completion rate, agent utilization, and other similar parameters. In one embodiment, in the control mode, the system may recommend or actually control the swapping of a calling list. In other modes, the administrator may review, edit, or adjust the measured parameters or the determined threshold values used by the system to recommend swapping, or actually control the replacement, of a calling list.

As is discussed in greater detail below, the subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

Figure 1:
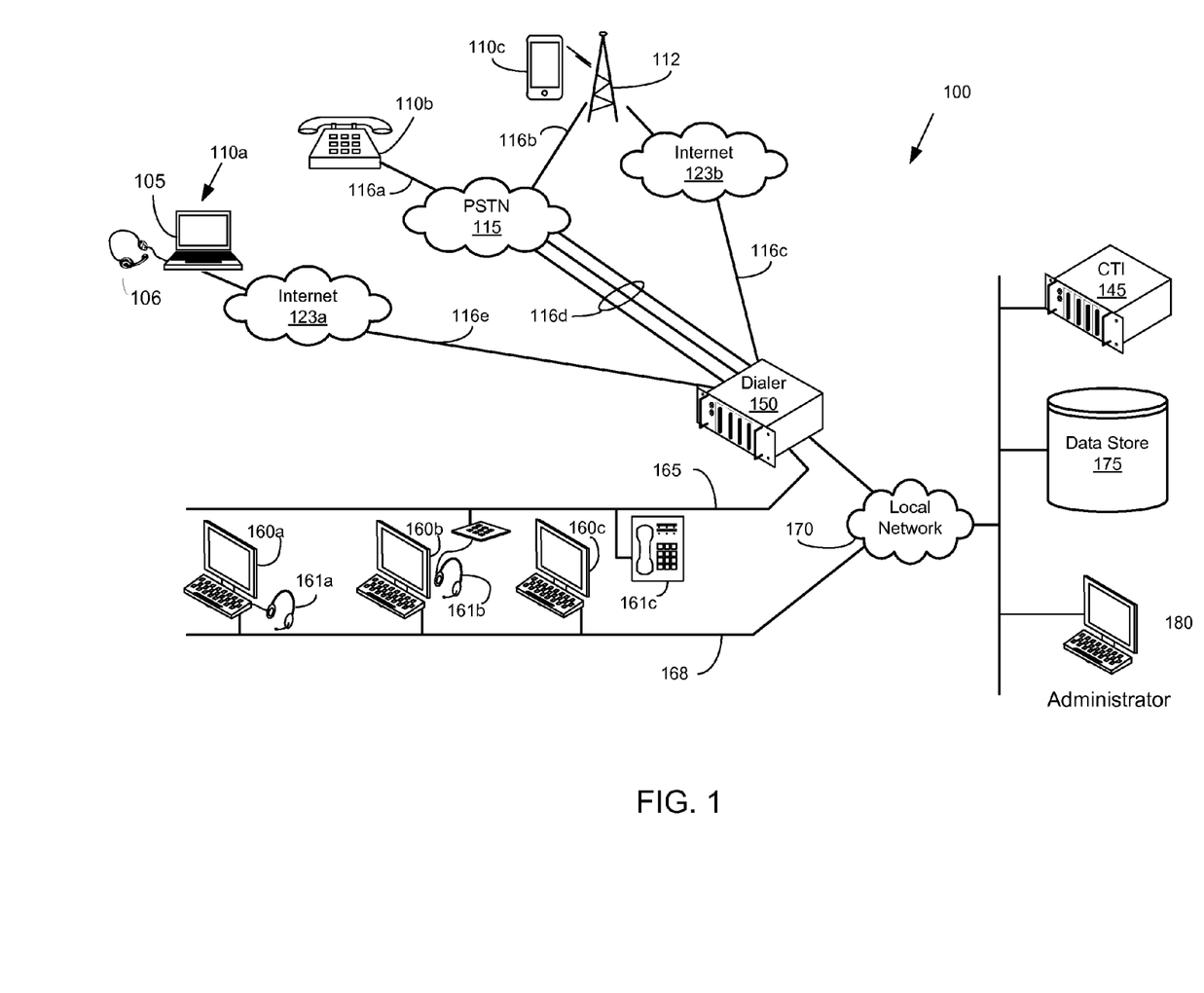
FIG. 1 shows an architecture of a contact center which may employ the various technologies disclosed herein.

FIG. 1 shows one embodiment of a contact center architecture 100 illustrating the various technologies disclosed herein. The contact center architecture 100 shown in FIG. 1 may involve voice calls that originate from the contact center. Although many aspects of contact center operation are disclosed in the context of voice calls, in various embodiments, the contact center may process other forms of communication such as, for example, facsimiles, emails, text messages, video calls, and chat messages. That is, in various embodiments, a call center may be considered as a contact center. However, for purposes of this disclosure, the term "contact center" is used throughout, although it is understood that the principles may apply to a center that handles only telephone calls.

In particular embodiments, the contact center may employ a dialer 150, such as a predictive dialer, to originate outbound calls on behalf of an agent at a rate designed to meet various criteria. Depending on the embodiment, the dialer 150 may directly interface with voice trunks using facilities 116d to a public switched telephone network ("PSTN") 115 for originating calls. In these embodiments, a call may be routed by the PSTN 115 and may comprise various types of facilities, including, but not limited to: T1 trunks, SONET based fiber optic networks, ATM networks, PSTN trunks 116d, or other facilities 116e, 116c. Further, depending on the embodiment, after a call is originated and answered by a party, the dialer 150 may connect the call with an agent or place the call in a queue for a next available agent. In the latter case, announcements or music may be provided to the party as the party waits in the queue. Similar to the other components within the contact center architecture 100, depending on the embodiment, the dialer 150 may comprise one or more software modules executing on a processing device hardware platform.

In various embodiments, outbound calls may originate from the dialer 150 processing a dialing or calling list made up of a collection of records including telephone numbers of targeted parties that is retrieved from the data store 175 that is accessible over a local network 170. In one embodiment the data store 175 can be a database that stores the calling list, and may contain other information on the targeted party. For example, each record may also include the targeted party's mailing or residential address. In certain embodiments, the data store 175 may be integrated with the dialer 150.

The calling list may include hundreds or thousands of records, and these may not be sorted in any particular order, but may be dialed in sequence. Specifically, in various embodiments, the calling list may or may not have records that are grouped together on some logical basis. For example, one calling list may have records for telephone numbers based on the east coast, whereas another calling list may have records for telephone numbers based on the west coast. In other examples, the calling list may have records based in both areas, and a filter can be used to access records according to desired criteria, such as in a certain time zone. Use of separate lists or applying a filter to a single list is considered functionally equivalent.

Depending on the embodiment, outbound voice calls may originate to parties using a variety of different phone types. For instance, a party may receive a call at a conventional analog telephone 110b connected to the PSTN 115 using an analog plain old telephone service ("POTS") line 116a. A party may also receive a call at a mobile device 110c, such as a smart phone or tablet, which wirelessly communicates with a mobile service provider ("MSP") 112. A call to a mobile device 110c may be routed from the PSTN 115 using an integrated services digital network ("ISDN") interface 116b or other types of interfaces that are well known to those skilled in the art. In addition, the MSP 112 may also route a call to a party that was received as packetized voice, referred to herein as voice-over-IP ("VoIP"), from an Internet provider 123b using Internet-based protocols. In turn, the call may have been routed to the Internet provider 123b over a trunk 116c from the dialer 155. For convenience, unless indicated otherwise, the term "trunk" refers to any type of facility 116c, 116d, or 116e providing voice calls to, or from, the contact center, regardless of the type of protocol or technology used. Specifically, a "trunk," as referred to herein, is not limited to time-division multiplexing ("TDM") technology.

Voice calls may also be received by a party employing a so-called "IP phone," "VoIP phone," or "soft phone" 110a. In one embodiment, this device may comprise a computing device 105, such as a laptop, desktop, or computing tablet that interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

Once outbound calls have been answered, they may be routed over facilities 165 to agents for servicing. That is, after a call is originated by the dialer 150 and a called party answers, the call may be connected with an agent. The physical area at which the agent sits is often referred to as an agent "position" and these positions are often grouped into clusters that are managed by a supervisor, who may monitor calls and the agents' productivity. According to various embodiments, an agent typically uses a computing device, such as a computer 160a-160c and a voice device 161a-161c. In particular embodiments, data may be provided to an agent's workstation computer 160a-160c over facilities 168 along with routing the call to the agent's workstation voice device 161a-161c over other facilities 165. The combination of computer 160a-160c and voice device 161a-161c may be referred to as a "workstation." Thus, the workstation collectively has a data capability and a voice capability, though separate devices may be used. In some instances, "workstation" may be used in reference to specifically either the data or voice capability at the agent's position, as appropriate to the context. For example, "routing the call to the agent's workstation" means routing a call to a voice device 161a-161c at the agent's position. Similarly, "routing the call to the agent" means routing a call to the appropriate equipment at an agent's position.

Depending on the embodiment, the voice device used by an agent may be a soft phone device exemplified by a headset 161a connected to the computer 160a. The soft phone device may be a virtual telephone implemented in part by an application program executing in a computer. The voice device may also comprise an Internet Protocol ("IP") based headset 161b or a conventional phone 161c. Thus, use of the term "phone" is intended to encompass all these types of voice devices used by an agent.

Further, in various embodiments, a CTI server 145 may be incorporated in the contact center architecture 100 to control, monitor, and/or coordinate other components of the architecture 100. As is described in greater detail below, the CTI server 145 may interact with the dialer 150 to coordinate call processing. For instance, in particular embodiments, the CTI server 145 may control the processing and selection of calling lists used by the dialer 150. In addition, in particular embodiments, the CTI server 145 (and/or dialer 150) may also monitor various components of the architecture 100. For example, the CTI server 145 may monitor performance parameters such as agent utilization rate, right party connect rate, the calling windows for particular calling lists, and/or the current abandonment rate for the dialer 150. In addition, the CTI server 145 (and/or dialer 150) may monitor actions taken by an administrator from his workstation 180.

The above components may be referred to as a "computing device," "processing device," or "system." This equipment may incorporate a local data store 175 and/or interface with an external data store. Further, the above components may be located remotely from (or co-located with) other components. Furthermore, one or more of the components may be implemented on a single processing device to perform the functions described herein. For example, in various embodiments, the functionality of the dialer 150 may also be incorporated with other contact center components.

In addition, the contact center architecture 100 may be provided as a hosted solution, where the call processing functionality is provided as a communication service (a so-called "communication-as-a-service" or "CaaS") to a contact center operator. There is no requirement that the components identified above actually be located or controlled by a contact center operator.

In addition, depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are located in their individual residences.

Swapping Calling Lists

Calling lists may be used by a contact center for originating calls for a particular campaign. Calling lists may further be segregated based on various factors, including the type of campaign, geographical area, etc. Thus, telephone numbers (or simply "numbers") in one calling list may pertain to a political survey campaign, whereas numbers in another list may pertain to a telemarketing campaign. Campaigns may last for a few days, few weeks, or longer.

In addition, calling lists may be segregated or generated based on time zones of the telephone numbers contained therein. In other words, geographical locations sharing a common time zone form the basis for grouping records in a calling list. This arrangement facilitates adherence to the appropriate calling windows. A calling window defines a time period when it is allowable to call a party. The time period is always expressed in terms of the local time of the called party. For example, various federal or state regulations may limit when certain types of calls may be made relative to the local time of the called party. Specifically, in some embodiments, telemarketing calls may be limited to being made between 8:00 a.m. and 9:00 p.m. of the called party. States may offer more restrictive calling windows, and contact centers frequently may implement an even narrower calling window based on their internal policies.

Figure 2:
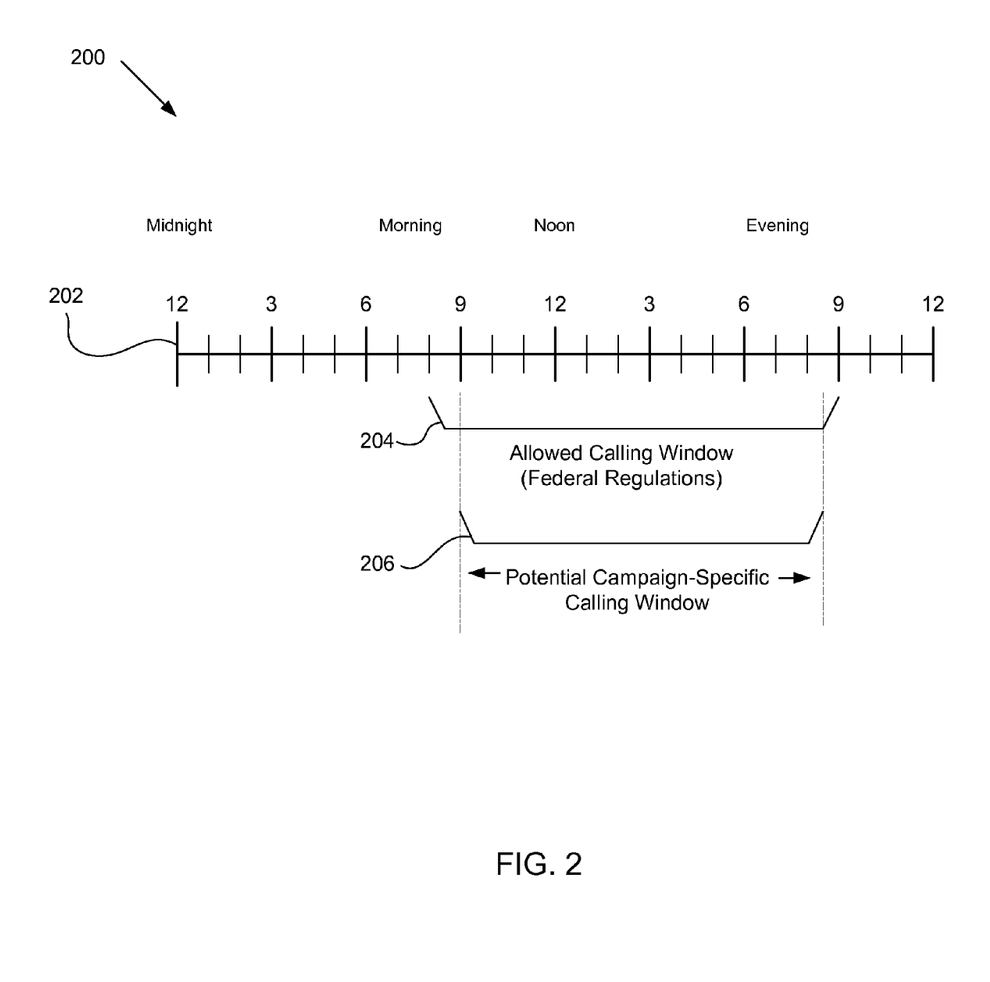
FIG. 2 discloses the concept of calling windows as it pertains to calling lists.

This concept is illustrated in FIG. 2. The diagram 200 illustrates a time line 202, which represents hours in a day. A calling window 204 is shown that may comport with certain federal regulations, such as when the calls cannot start earlier than 8:00 a.m., or go past 9:00 p.m. Some contact center operators may define their own calling window, involving a narrower calling window 206, which opens at 9:00 a.m. and closes at 8:30 p.m. The appropriate calling window may be impacted by various considerations and may be defined on a per-campaign basis taking into account per-state or national regulations, and other factors.

The local time of the called party may not be the same as the local time of the originating contact center, since the contact center typically originates calls across the U.S. and possibly internationally. Thus, the calling window, the time zone of the contact center, and the time zone of the called party must all be considered before initiating a call to the called party. For practical purposes, the time zone can be equated to a location of the called party. Thus, if the contact center is in the same time zone as the called party, then the contact center can originate calls during the calling window based on its own time. However, when the called party is in another time zone, the calls must be adjusted appropriately. In most instances, each time zone represents a shift of one hour.

For example, if the contact center is located in the "Eastern Standard Time" ("EST") zone, then 9:00 a.m. EST is 6:00 a.m. in the "Pacific Standard Time" ("PST") zone. Thus, the contact center must wait two hours before it is 8:00 a.m. in the PST zone, which typically is the earliest time at which calls may be offered in the PST zone. As expected, a contact center located in the EST zone largely directs calls in the early morning to the east coast of the U.S., and then as the day progresses, directs calls further westward. At the end of the day, the contact center may continue to direct calls to the west coast, while the calling window on the east coast has closed.

This natural movement from east-to-west is sometimes referred to as a "follow-the-sun" strategy. That is, the calling window opens on the east coast where the sun rises, and travels westward, where the sun sets. The time zone difference for locales in the U.S. can be up to six hours. Thus, the beginning/ending of a calling window may be up to six hours from another calling window. This also impacts the selection of calling lists, which may be broken down into time zones.

Figure 3:
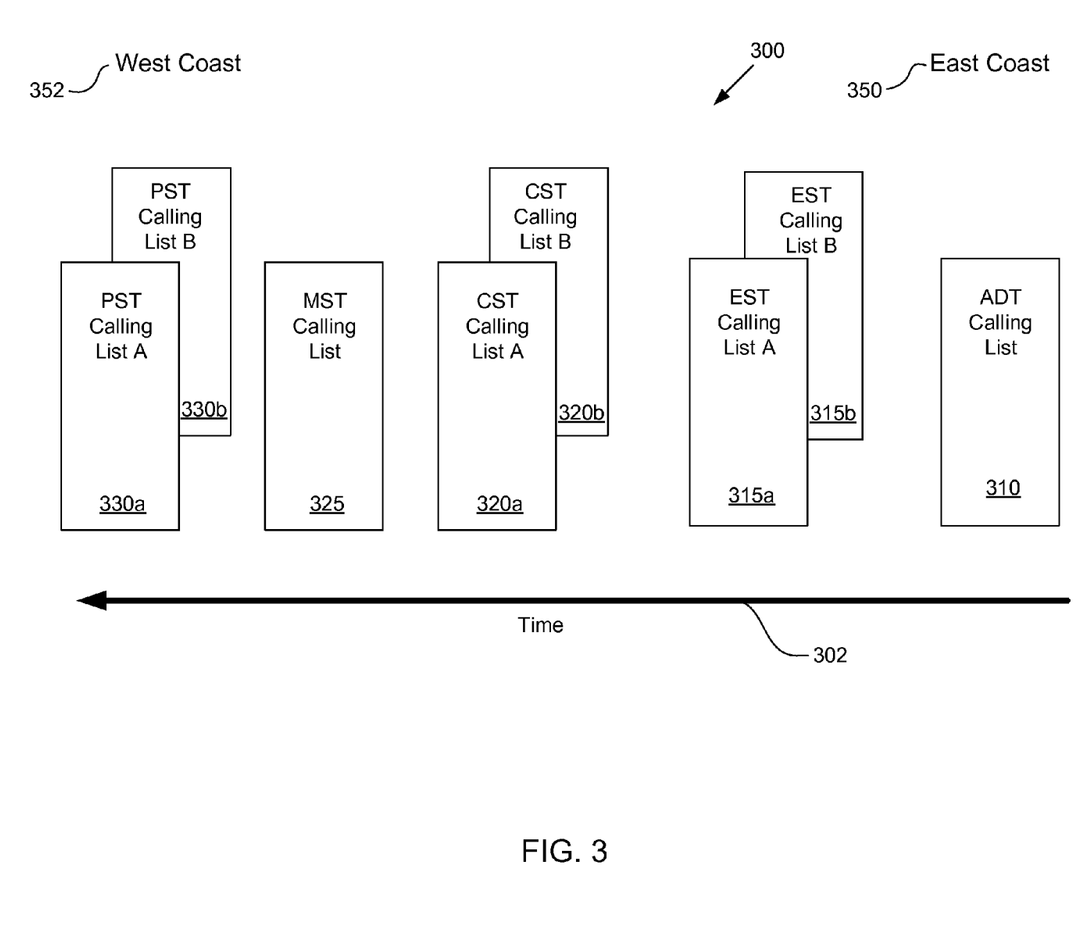
FIG. 3 discloses a high level overview of using different calling lists at different times.

FIG. 3 illustrates one follow-the-sun strategy with respect to selecting calling lists. In FIG. 3, the diagram 300 illustrates geography associated with the east coast 350 on the right side, and with geography on the west coast 352 on the left side. For purposes of illustration, this span could represent up to at least six time zones. The timeline 302 proceeds from right to left, in accordance with the sun rising on the east coast first, and proceeding to the west coast.

The first calling list may be the ADT Calling List 310. This is the "Atlantic Daylight Time" ("ADT") zone that covers portions of Newfoundland, which is east of the U.S. Although not part of the U.S., this time zone is in North America and many contact centers may originate calls to other countries in North America. Thus, if the contact center is located in the EST zone, then when it is 8:00 a.m. at the contact center, it is already 9:00 a.m. in the ADT zone. Thus, the contact center could start calling the ADT Calling List 310 as soon as 7:00 a.m. EST. However, it may not be appropriate for the contact center to originate calls in the EST zone at that time using list 315a or 315b until the appropriate calling window opens, which is assumed to be 8:00 a.m. EST. At 8:00 a.m. EST, the contact center may begin using the EST Calling List A 315a. Based on various conditions, the contact center may then switch over to EST Calling List B 315b. Meanwhile, during this time the contact center can continue using the ADT Calling List 310.

At 9:00 a.m. EST, the contact center can begin dialing calls from the "Central Standard Time" ("CST") zone, as it is now 8:00 a.m. in this time zone. Again, the contact center may begin with CST Calling List A 320a, and then switch over to CST Calling List B 320b as conditions warrant.

Similarly, at 10:00 a.m. EST the contact center can start using the "Mountain Standard Time" ("MST") Calling List 325. Further, at 11:00 a.m. EST, the contact center can then start using the PST Calling List 330a and 330b.

At the end of the day, the contact center must terminate the use of the eastern most calling lists first. Namely, the use of the ADT Calling List 310 needs to cease by 8:00 p.m. EST, which is 9:00 p.m. ADT. Similarly, calls using the EST Calling Lists 315a, 315b must cease at 9:00 p.m. EST. Finally, calls using the PST Calling Lists 330a, 330b must cease at midnight at the contact center, which is 9:00 p.m. PST.

Thus, it can be seen that as calling windows open beginning in the east, the appropriate eastern oriented calling lists can be used for originating calls. Further, as the calling windows close, the eastern oriented calling lists are the first to terminate and the western oriented calling lists are the last to terminate. The number of time zones in the North America geographic area is shown in Table 1. While the table includes a number of familiar U.S. time zones, such as Eastern, Central, Mountain, and Pacific, the number of applicable time zones for North America includes other time zones. When mapping a calling list to a time zone, consideration must be given to various anomalies, such as certain municipalities that do not change from standard to daylight savings times, as well some areas which incorporate a time zone that is offset by 30 minutes, as opposed to a full hour. The Universal Time Coordinate ("UTC") shown in Table 1 is the offset hours reference.

TABLE 1

| Abbreviation | Full name | Time Zone |
| --- | --- | --- |
| ADT | Atlantic Daylight Time | UTC - 3 hours |
| AKDT | Alaska Daylight Time | UTC - 8 hours |
| AKST | Alaska Standard Time | UTC - 9 hours |
| AST | Atlantic Standard Time | UTC - 4 hours |
| CDT | Central Daylight Time | UTC - 5 hours |
| CST | Central Standard Time | UTC - 6 hours |
| EDT | Eastern Daylight Time | UTC - 4 hours |
| EGST | Eastern Greenland Summer Time | UTC |
| EGT | East Greenland Time | UTC - 1 hour |
| EST | Eastern Standard Time | UTC - 5 hours |
| HADT | Hawaii-Aleutian Daylight Time | UTC - 9 hours |
| HAST | Hawaii-Aleutian Standard Time | UTC - 10 hours |
| MDT | Mountain Daylight Time | UTC - 6 hours |
| MST | Mountain Standard Time | UTC - 7 hours |
| NDT | Newfoundland Daylight Time | UTC - 2:30 hours |
| NST | Newfoundland Standard Time | UTC - 3:30 hours |
| PDT | Pacific Daylight Time | UTC - 7 hours |
| PMDT | Pierre & Miquelon Daylight Time | UTC - 2 hours |
| PMST | Pierre & Miquelon Standard Time | UTC - 3 hours |
| PST | Pacific Standard Time | UTC - 8 hours |
| WGST | Western Greenland Summer Time | UTC - 2 hours |
| WGT | West Greenland Time | UTC - 3 hours |

It is not necessarily the case that when a calling window opens for a particular time zone that the corresponding calling list for that time zone is started and continuously used until the calling window for the time zone closes. Rather, an administrator may selectively start and stop a calling list during the applicable calling window. For example, returning to FIG. 3, there may be multiple calling lists for the EST that could be used (e.g., EST Calling List A 315a and EST Calling List B 315b). The administrator may start one list and then swap it out for another list based on monitoring various conditions. Or, the administrator may start both calling lists, stop both, and then restart one or the other calling list later in the shift.

For example, the EST Calling Lists may be used early morning, and then stopped around lunchtime EST. Instead, at that time when EST individuals are at lunch, the contact center may focus on processing the CST Calling Lists, which are on CST, since lunchtime in the CST is an hour away. Once lunch passes in the EST, the EST Calling Lists may be resumed, and instead the CST Calling List may be suspended. A similar approach may be used with calling lists in the MST and PST zones. Thus, within a calling window, there may be times where the ability to reach called parties peaks and diminishes.

Thus, it is not uncommon for the contact center administrator to cease using one calling list and start using another calling list within a calling window. This is referred to as "switching-in" a calling list (e.g., to start using the list for processing calls) and "switching-out" (to cease using the list for processing calls) during a day, as well as "swapping" calling lists. There are many factors that an administrator may consider when swapping calling lists. The above example has largely focused on time zones and calling windows, which is one basis for swapping lists.

Other factors may include how well the calling list is performing, which may involve how well the agents are being utilized. As noted above, there may be certain times of the day that a calling list is not performing well, as for example, during lunchtime. Other times may include certain times of the day when school-age children arrive at home. This can be a time when parents, who are not working, come home from running errands and are available to answer the phone.

Measuring how well a calling list is performing can be accomplished by observing a particular parameter designed as a performance indicator. This is referred to herein as the "measured performance parameter" ("MPP") One metric that may be used as the MPP is a value indicating how many calls are answered by the desired or right party—so called "right party connects" ("RPC"). An RPC is when the intended party answers, as opposed to an answering machine answering, a no-answer condition being encountered, or some other outcome occurs. The RPC rate can be influenced by various factors, which may not be readily ascertainable by the contact center administrator. For example, during periods of poor weather, including periods of extreme heat, people may generally stay indoors, and therefore may be more likely at home to answer the phone. On the other hand, after a period of inclement weather when the weather moderates, people may be more likely to go outside of their home, and unavailable to answer their phone. Thus, local weather patterns are one variable that can impact the performance of a calling list. Obviously, such weather patterns may greatly vary in different parts of the country, and hence, can vary between and within time zones. The administrator may observe that a particular calling list is underperforming, but may not necessarily be able to identify the causes for this. Often times, the administrator does not really need to understand why the performance is lagging.

Other MPPs include the number of sales or "conversions" that agents are completing. A convention is a successful outcome, whether it involves soliciting a membership, a sale, donation, pledge, etc. Conversions may be influenced by the RPC rate and other factors as well. However, it is possible to have a low RPC rate, but have a higher conversion rate. For some contact centers, the conversion rate, as opposed to the RPC rate, is more important as the MPP for measuring the success rate of calls on a particular calling list.

Another MPP metric may be the abandonment rate of calls. The abandonment rate measures how many calls that are attempted, but do not actually connect to an agent. Calls that may not be connected to an agent involve calls to numbers that are disconnected or answered by an answering machine or for which the call is terminated because an agent is not currently available. The abandonment rate of calls may be measured and monitored by the contact center administrator and used as a basis for switching out one list for another.

The particular MPP that is used as the basis for swapping lists can vary from embodiment to embodiment. However, assuming the administrator is not randomly swapping calling lists, the administrator is using one or more MPPs in determining whether to replace one calling list for another.

Exemplary Process Flow

As described above, an administrator may manually monitor one or more MPPs associated with using a calling list, and based on experience, may decide to swap one list for another. Various decisions, which may not even be cognizable by the administrator, may be involved in deciding to swap a list. One approach is to mimic the administrator's experience by using an automated list scheduling system ("ALS system") to learn from the administrator's actions by observing the various parameters when the administrator manually swaps a calling list. The ALS system then applies what it has learned to control swapping of calling lists in the future.

Figure 4:
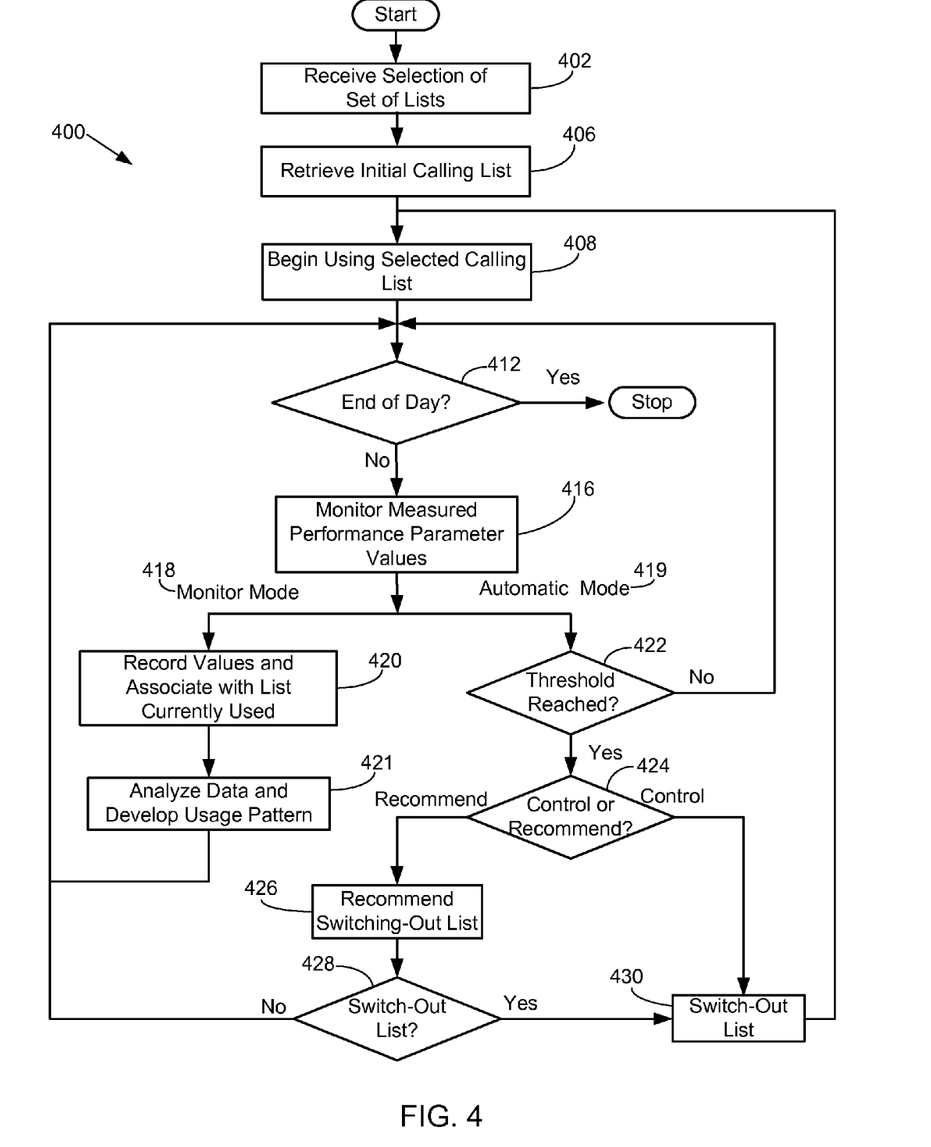
FIG. 4 illustrates one embodiment of a process flow disclosing a learning mode and a control mode for determining when to swap a calling list.

One process flow illustrating how the administrator's actions can be learned and applied by an ALS system to manage the scheduling of calling lists is shown in FIG. 4. Depending on the embodiment, the logical operations described herein may be implemented (1) as a sequence of computer implemented acts or one or more program modules running on a computing system and/or (2) as interconnected machine logic circuits or circuit modules within the computing system. For instance, the ALS system may reside on the dialer 150 or on a separate device such as the CTI server 145. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

The process 400 begins with receiving a selection of a set of calling lists identified by the administrator in operation 402. Identification of the set of calling lists does not necessarily require that each calling list will actually be used. Rather, this indicates the set of calling lists that may be used, depending on circumstances. The administrator defines an initial calling list to use at the beginning of the day and this initial calling list is retrieved in operation 406. Typically, this list is selected based in part on time zones and calling windows, since only certain geographical areas may be called at certain times of the day. Specifically, returning to the example of using the U.S. as the calling area, at the beginning of the day, the eligible calling lists are likely to contain east coast oriented numbers, since these are first to be eligible in a conventional calling window. In operation 408, the calling list is used to commence dialing operations. For instance, in particular embodiments, this operation 408 entails the ALS system instructing the dialer 150 on which calling list to begin using to originate outbound calls.

Throughout the process, an operation 412 is continuously performed to determine if the end of day has been reached. More specifically, this operation could be at the end of the last calling window for which calls could be made. For example, if the western-most time zone is the PST, then there is a time limit when use of the corresponding calling list must cease. If the end of day is reached in operation 412, then the process stops. Otherwise, the process continues with operation 416.

In operation 416, a threshold condition of a MPP is monitored. More specifically, at least one MPP is monitored to determine if it has exceeded a threshold value. Multiple MPPs may be monitored, with corresponding threshold values. The MPP(s) may include one or more of those identified above, which include answering rate, conversion rate, right party connect rate, agent utilization rate, etc. These MPPs, as well as others identified by a contact center administrator, may be defined as threshold variables that are monitored, or the ALS system may observe a variety of parameters and may identify which parameters are significant in determining when to switch-out a calling list. Although reference is made to the ALS system swapping or switching-out a list, in various embodiments, the ALS system may merely provide an indication that the current list should be switched out. For example, in particular embodiments, the ALS system provides an indication to the dialer 150 that the current list should be switched out and that the dialer 150 should begin to use another calling list.

Returning to FIG. 4, after monitoring the MPP(s) in operation 416, the process divides into one of two modes of operation. The first mode 418 is the "monitor mode" 418 and the second mode is the "automatic mode" 419. The monitor mode 418 is also referred to as the "learning mode" as it is in this mode that the administrator's calling list usage and the MPPs are monitored. This involves recording the values of the MPPs over time in operation 420, which are correlated with the associated calling list and noted when the administrator swaps one calling list for another.

These data values are analyzed using various algorithms known in the art to determine a pattern and a threshold value for each of the corresponding MPPs in operation 421. Frequently, a number of data values are required before a confidence level is obtained in determining the relevant MPPs and corresponding threshold values. The process loops back to operation 412, where (assuming the end of day has not been reached), additional data points of the MPPs are monitored and collected in operation 416. In some embodiments the administrator may define the appropriate MPPs, whereas in other embodiments, the ALS system may monitor a large set of parameters to determine which MPPs are relevant.

The other mode of operation is the "automatic mode" 419. The automatic mode refers to the mode where the pattern analysis is used to recommend, or actually control, swapping a calling list. This may require a period of time before the supervisor's calling list changes are monitored sufficiently and analyzed so as to develop guidelines for swapping the calling list. In some embodiments, the monitor mode requires a period of time sufficient to develop confidence levels for the threshold values of the corresponding MPPs. In some instances, the criteria used to trigger swapping may be relatively simple and allow a high degree of confidence in a short period of time for the monitor mode, whereas in other cases it may be more complicated and require a longer period of time for the monitor mode.

In the automatic mode 419, the next step is determining whether the threshold for the applicable MPP(s) has been reached in operation 422. This threshold is based on whether the monitored criterion (or criteria) has reached a specific value associated with switching-out the calling list. If not, then the process loops back to monitor subsequent values by returning to process 412.

Once the threshold has been reached in operation 422, this may trigger the swapping (switching-out) of the calling list. More specifically, at this point the action taken may depend on the embodiment. For example, in operation 424, the action may depend on whether a "recommend" or "control" mode of operation is currently selected. The recommend mode continues to operation 426 where a recommendation is provided to the administrator to switch-out the calling list. The recommendation can be provided in various ways. For instance, in one embodiment, a dashboard is presented to the administrator with a current value of the MPP, along with a threshold value at which a recommendation is provided to switch-out the list. The recommendation can be indicated via an icon or text message on the dashboard. In addition, a text message, email message, or other alerting means can be provided to the administrator. The recommend mode allows the administrator to have the ultimate control as to when a calling list is swapped, and allows the administrator to address and monitor other activities in the contact center.

Assuming the administrator responds to the notification in operation 428 to switch-out the current calling list, the switch-out of the calling list occurs in operation 430. In other instances, the administrator may chose to continue using the existing list. Assuming the list is switched-out, the process then loops back to operation 408 where use of the new list is started.

If the control mode of operation is implemented, then in operation 424, the ALS system automatically swaps the current calling list with the next list in operation 430. At this point, the process loops back to operation 408 where the new list is started.

When changing to a new list, there are two decisions involved. First, there is the decision whether to terminate using the current list and change to another list. This is accomplished by monitoring the threshold value of the appropriate MPP. Second, there is a decision of what new list should be used to replace the current list. In some embodiments, an ordered sequence of calling lists may be defined, so that in effect, the decision of what should be the next list is already made. This sequence of lists can be defined by the administrator beforehand. The sequence may be determined by, for example, the order in which the applicable calling windows for the lists open.

Alternatively, a separate process can be defined for determining the next calling list to start. For example, if there are multiple calling lists that could be selected, the calling list with the lowest penetration rate, or the earliest date for completion, could be given preference over other lists. Thus, a priority parameter for determining which of several lists should be used can be defined for determining which of several eligible lists should be used. Lists may require a certain penetration rate at which point usage of the list for the campaign may be terminated.

Examples of Monitoring Measured Performance Parameters

Figure 5:
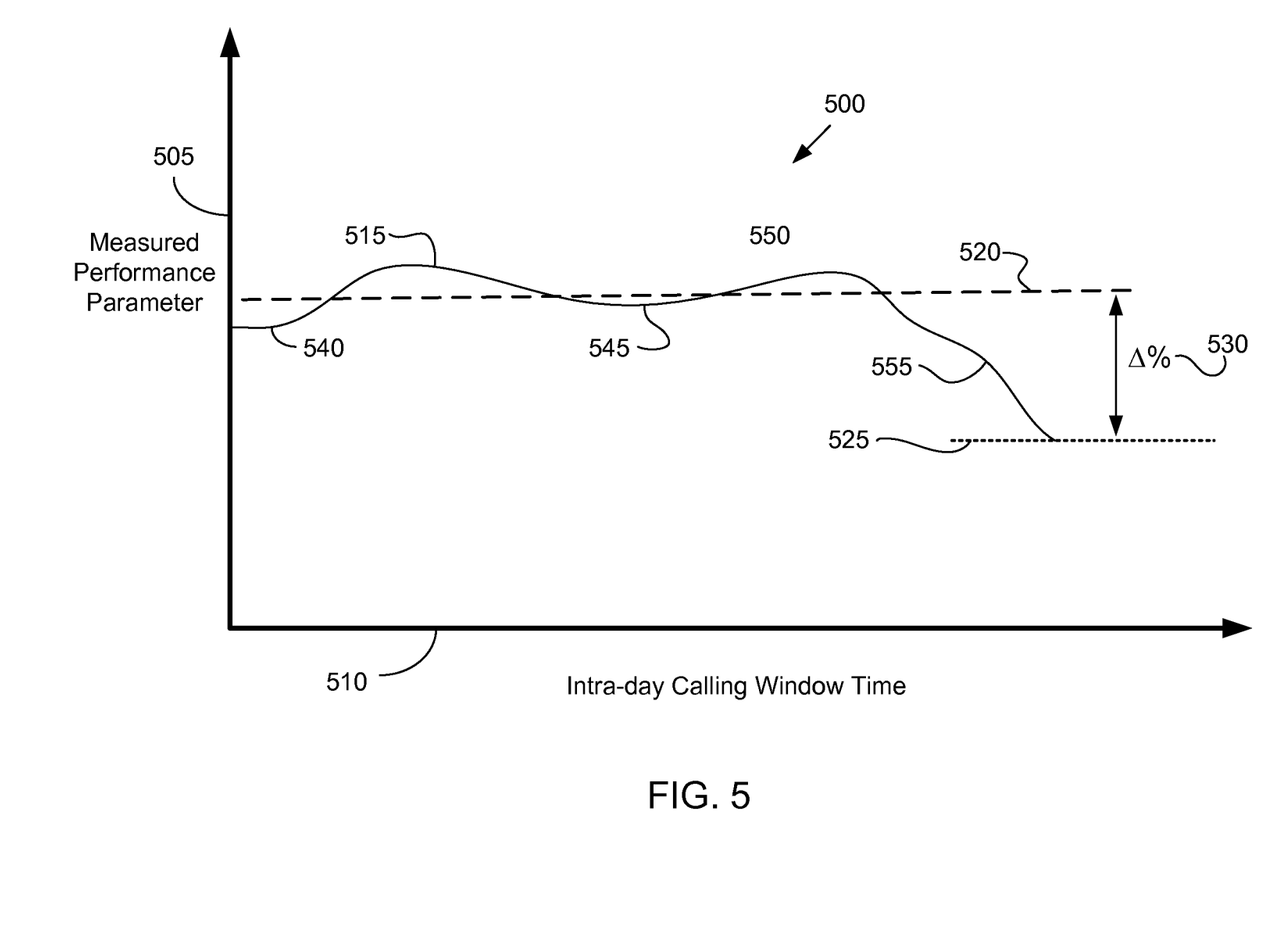
FIG. 5 illustrates another embodiment of measuring a performance parameter over time for determining when to swap a calling list.

FIG. 5 illustrates a generic example of monitoring a MPP, determining an average, and then using the acquired information to determine when a threshold value is reached. In FIG. 5, the diagram 500 depicts the MPP that is monitored, as indicated by the y-axis 505. The MPP could be time, cumulative usage, conversion rate, completed sales volume, agent utilization, including any of the above mentioned metrics. This MPP is shown as graphed against time, which is depicted in the x-axis 510. Specifically, in one embodiment, the time reflects the intra-day calling window time for a given day. Thus, the time could represent a few hours, or the entire shift of eight, twelve, or more hours.

The MPP is depicted by a solid line 515 that varies with time. Presumably, this value varies and is continuously measured. The dotted line 520 may reflect a cumulative average of the MPP over a prior time period (or some average metric). If it is an average value, then this could be a daily average, weekly average, a running average, or a value based on some other time period. As shown in the FIG. 5, the MPP has a portion 540 that starts out below the average value 520, peaks above the average value, encounters a second valley 545 below the average value, peaks again above the average value, and then commences a gradual downhill trend 555. At a certain point 525, a threshold value of the MPP may be reached that is defined as a percentage 530, A % that is below the average value, which triggers the replacement of the calling list.

FIG. 5 could represent the MPP as observed by an administrator and used for manually swapping a calling list. The administrator may monitor the MPP and decide to replace the list once the threshold percentage 530 is reached. In a learning mode, FIG. 5 can represent the ALS system monitoring the same MPP, so that when the same parameter(s) reaches a threshold value, the ALS system then automatically swaps out the calling list, or recommends to the administrator to swap out the calling list.

Frequently, the triggering of a calling list to be swapped may not be as simple as monitoring a single MPP, but may involve monitoring several parameters. There may be several MPPs that must be analyzed, and the trigger is based on an inter-relationship of the MPPs. For example, in instances in which the call campaign involves telemarketing, if agents are particularly successful in converting potential customers (thereby reflecting, e.g., a high revenue), it may be acceptable to have a lower average agent utilization (to an extent). However, if the purpose of the call campaign is to seek political donations, then an agent utilization rate may be more important and the average solicitation per call may not be so important.

In various embodiments, the MPPs may be generated by the call handling system based on existing measurements and metrics that are generated during the normal course of operation. These values can be provided to the ALS system that read and processes the values in accordance with the concepts disclosed herein.

Cumulative Time as Measured Performance Parameter

Figure 6:
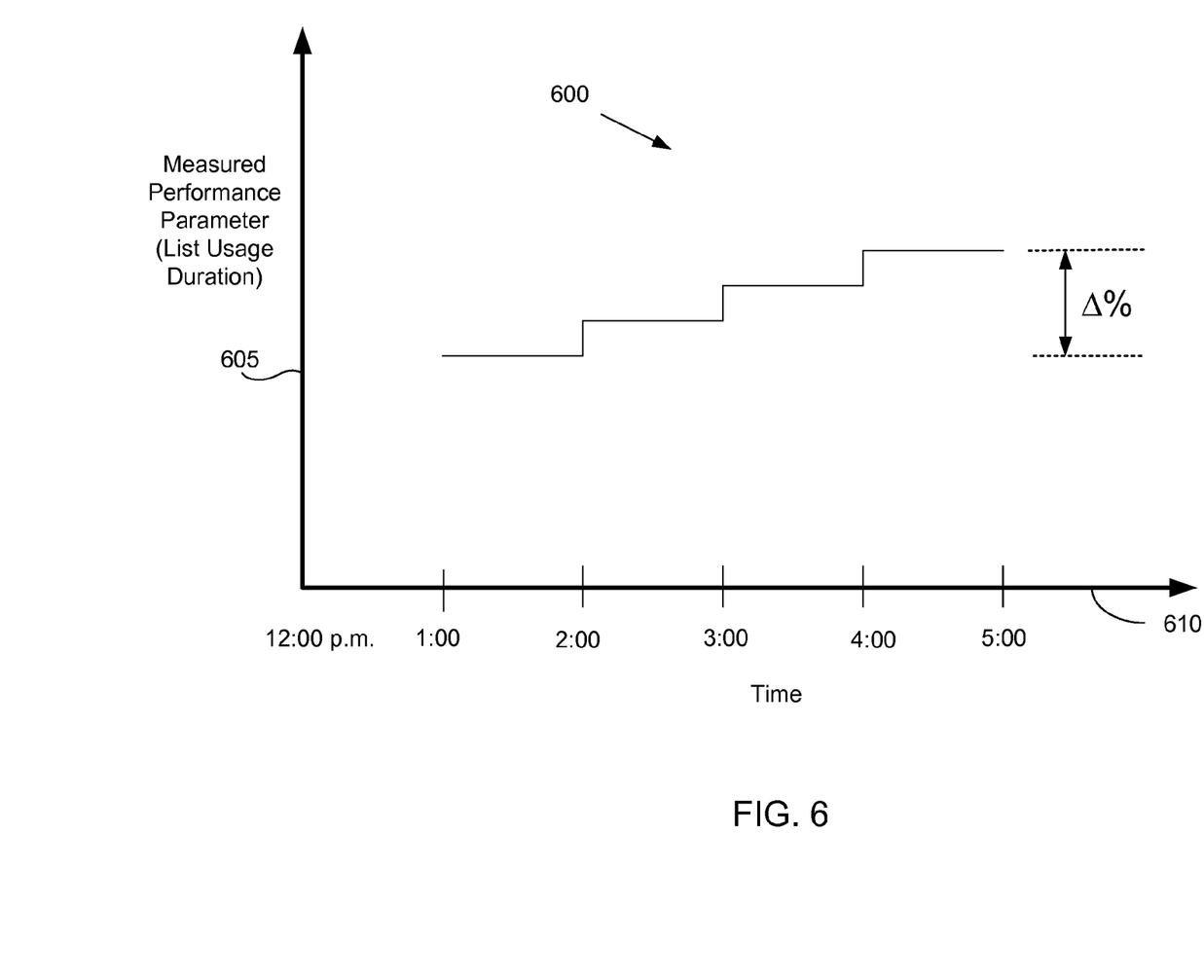
FIG. 6 illustrates one embodiment of measuring usage of a calling list over time as a basis for determining when to swap a calling list.

FIG. 6 illustrates another embodiment of monitoring a MPP, which is cumulative usage of the calling list, with respect to time. The diagram 600 illustrates the MPP of cumulative time as the y-axis 605, which measures the calling list cumulative usage. The time is measured on the x-axis 610, and depicts time during a shift.

In FIG. 600, the cumulative time is depicted in whole numbers of hours, although minutes or seconds could have been used. Hence, a "stair-cased" graph is produced. For each hour on the time (X) axis, the MPP, which is cumulative usage, is incremented by one. In this embodiment, the calling list is started at 1:00 p.m. and its use has incremented by four hours by 5:00 p.m. The specific value of the cumulative hours is not material. The administrator may regularly swap out a calling list after four hours of use, and so the MPP is "hours of use" and the threshold for swapping out the list is four hours.

In other embodiments, the threshold criteria could be a combination of metrics. For example, a calling list may be swapped out once it has been used for a minimum of 3 hours and the connect rate drops below a certain percentage. Other criteria can be used to structure a combination of variables that must be met before the calling list usage is terminated.

Learning Algorithm

The learning mode involves learning when to automatically swap out a calling list. Thus, in various embodiments, the learning mode may involve the ALS system developing some type of predictive model for determining when to swap out a calling list. For instance, in particular embodiments, the learning mode may involve the ALS system performing pattern recognition based on data for a number of MPPs during past times when calling lists were swapped out. Further, this may involve the ALS system developing model(s) based on one or more different types of classifiers such as binary classifiers (e.g., logistic regression and/or support vector machine) and/or probabilistic classifiers (e.g., Naive Bayes) as well as performing feature selection and/or feature extraction to identify the appropriate MPPs.

Depending on the number of MPPs monitored, the complexity of the predictive model, and the required accuracy of the model, the threshold may be established after conducting an analysis on MPPs associated with a small number of occurrences of swapping out calling lists. However, this is typically not the case since monitoring one or more swapping out of calling lists over a short period of time performed by one or two administrators may result in establishing a threshold that may not be representative of how future swaps should occur (e.g., a low confidence level of the established threshold). Thus, it is typically more desirable for the learning mode to involve observing a plurality of manual swaps conducted by multiple administrators over a number of different past periods of time so that the appropriate MPPs and thresholds having higher confidence levels can be determined.

Further, it is noted that in various embodiments, the ALS system performing the learning mode process is favored over simply having the contact center administrators identify the appropriate MPPs and thresholds for when calling lists should be swapped out. This is because in many instances, the thresholds for swapping out calling lists may be dependent on a number of different combinations of the MPPs that only the ALS system may be able to deduct from analyzing the historical MPPs data.

For example, the ALS system may conduct the learning mode process on data for a number of swaps made by administrators over several charity fund raising outbound call campaigns and "learn" that the appropriate threshold for swapping out a calling list during one of these campaigns is when MPP "A" is between 0 and 100 units and MPP "B" is 25% below the average value for MPP "B." However, the ALS system may also "learn" that the appropriate threshold is when MPP "A" is between 100 and 120 units and MPP "B" is only 15% below the average value for MPP "B." That is, the ALS system may conclude from the learning mode process that there are multiple combinations of values (e.g., measurements) for the applicable MPPs that may be considered an appropriate threshold for swapping out a calling list.

Therefore, in many instances, the ALS system performing the learning mode process provides a significant improvement over a process involving administrators simply identifying the appropriate MPPs to monitor and thresholds for swapping out calling lists. That is to say, although the learning mode carried out by the ALS system may be based on data involving administrators manually swapping out calling lists, in many instances, the ALS system is able to more effectively analyze the MPPs, identify patterns and the applicable MPPs using predictive modeling, and establish thresholds that signal when calling lists should be swapped out. In fact, in many instances, an administrator may not even know which MPPs should be monitored, let alone the different combinations of measures (thresholds) for the applicable MPPs that signal when calling lists should be swapped out.

However, with that said, the administrator may be able to manually identify applicable MPPs and/or thresholds or alter the MPPs and/or thresholds derived by the ALS system in some embodiments. For these embodiments, a graphical user interface may be provided to the administrator to view the observed and derived MPPs and thresholds over time, and allow the administrator to edit them accordingly. Therefore, although the administrator may not know in some instances the cumulative conditions as to when calling lists should be swapped out, a summary of the MPPs and thresholds identified by the ALS system can be presented to and edited by the administrator.

Calling List Filters

The above examples are based on using separate calling lists, and swapping in one calling list for another. The calling lists can be distinguished as being assigned for different campaigns, agent groups, time zones, etc. However, it is not necessary that these logically distinct sets of telephone numbers are structured as being in different calling lists. Rather, a single calling list can be defined where logically distinct sets of numbers are identified by using a list filter.

For example, consider multiple lists, each having only numbers in a single time zone. Selecting a list for use in a dialer means that only numbers in that time zone will be called. On the other hand, a single common list could be defined, where each number includes an indication of its time zone. A filter can be defined that retrieves or selects number from a given time zone. Thus, application of a filter acting on time zone data functions to provide the same result as a single list including only the numbers from a given time zone. Consequently, application of a filter to a master list to segregate numbers having a common characteristic is considered as equivalent to defining separate lists with each having a common characteristic.

Correlating Campaign Type with Measured Performance Parameter

The monitored MPPs may depend on the type of campaign type. Thus, the ALS system may use the type of campaign to determine which set of MPPs to monitor, and which threshold values are appropriate to signal a change of list. For example, in a survey-oriented campaign, the MPP may be the right party connect ("RPC") rate. Since the purpose of the campaign is to obtain survey results from a person in the household, ensuring a high RPC rate may be the most important MPP to monitor. If a MPP drops below a certain level, then another list may be used that may have a higher MPP. In this case, a revenue-per-agent parameter would be inappropriate as a MPP, since there are no sales in this campaign.

However, if the campaign is a telemarketing campaign, then perhaps a revenue-per-agent is a suitable MPP. In this case, if the calling list is generating a high sales level for the agents, then it may not matter that the RPC is low. In other types of campaigns, other sets of MPPs may be appropriate. The MPP(s) used may be determined in part by the type of the calling campaign. Thus, the ALS system can also take into consideration the type of calling campaign that is being monitored in the learning mode, and determine a set of thresholds that are to be applied for that type of campaign in the control mode.

Exemplary Computer Processing Device

Figure 7:
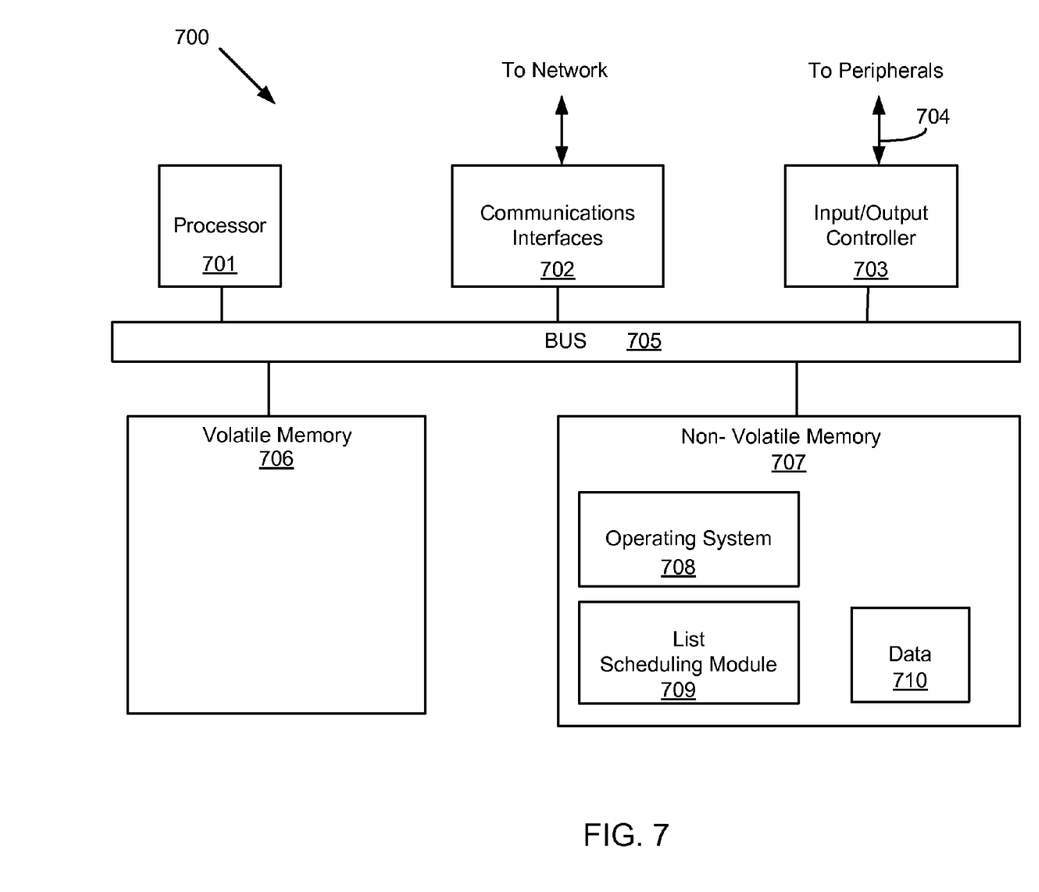
FIG. 7 one embodiment of a processing device for practicing the technologies and concepts herein.

FIG. 7 is an exemplary schematic diagram of a computer processing system that may be used in embodiments of various architectures, such as architecture 200 shown in FIG. 2, to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 7, the processing system 700 may include one or more processors 701 that may communicate with other elements within the processing system 700 via a bus 705. The processor 701 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 700 may also include one or more communications interfaces 702 for communicating data via a network 270 with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 703 may also communicate with one or more input devices or peripherals using an interface such as, but not limited to: a keyboard, a mouse, a touch screen/display input, microphone, pointing device, etc. The input/output controller 703 may also communicate with output devices or peripherals, such as displays, printers, speakers, headsets, banner displays, etc. These may be used, in part, to receive Administrator input.

The processor 701 may be configured to execute instructions stored in volatile memory 706, non-volatile memory 707, or other forms of computer readable storage media accessible to the processor 701. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 707 may store program code and data, which also may be loaded into the volatile memory 706 at execution time. For example, the non-volatile memory 707 may store one or more modules 709 that may perform the above-mentioned process flows and/or operating system code 708 containing instructions for performing the process and/or functions associated with the technologies disclosed herein. The list scheduling module(s) 709 may also manage the lists, including monitoring data in the learning mode, and controlling the lists in the control mode. The measure performance parameters may be stored in related data 710. The data in the non-volatile memory may be copied (not shown) in the volatile memory 706 at run time. The volatile memory 706 and/or non-volatile memory 707 may be used to store other information including, but not limited to: records, applications, programs, scripts, source code, object code, byte code, compiled code, interpreted code, machine code, executable instructions, or the like. These may be executed or processed by, for example, the processor 701 and may form a part of, or may interact with, the module(s) 709.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

The invention claimed is:

1. A dialer for originating outbound voice calls for a calling campaign, the dialer comprising a microprocessor configured to:
   identify a measured performance parameter ("MPP") associated with processing a first calling list;
   record a plurality of values for the MPP at a plurality of times over a first time period of use of the first calling list for originating the outbound voice calls;
   analyze the plurality of values for the MPP recorded over the first time period to determine a threshold value for terminating use of the first calling list;
   monitor one or more values for the MPP at a plurality of times over a second time period of use of a second calling list for originating the outbound voice calls;
   determine a monitored value for the MPP over the second time period exceeds the threshold value of the MPP; and
   in response to the monitored value for the MPP over the second time period exceeding the threshold value:
   terminate use of the second calling list;
   begin use of a third calling list for originating the outbound voice calls; and
   originate an outbound voice call using the third calling list.

2. The dialer of claim 1, wherein the microprocessor is configured to use a calling window and a time zone associated with the first calling list to determine the threshold value.

3. The dialer of claim 1, wherein the microprocessor is configured to terminate use of the second calling list by:
   providing a recommendation of terminating use of the second calling list to an administrator; and
   upon receiving a response from the administrator to terminate use of the second calling list, terminating use of the second calling list.

4. The dialer of claim 1, wherein the first calling list and the second calling list comprise numbers located in different time zones.

5. The dialer of claim 1, wherein an average value calculated from the plurality of values for the MPP is used to determine the threshold value.

6. The dialer of claim 1, wherein the MPP is identified based on a type of the calling campaign.

7. A computer-readable, non-transitory medium storing instructions that when executed cause a processor to:

identify a measured performance parameter ("MPP") associated with processing a first calling list of a calling campaign;

record a plurality of values for the MPP at a plurality of times over a first time period of use of the first calling list;

analyze the plurality of values for the MPP recorded over the first time period to determine a threshold value for terminating use of the first calling list;

monitor one or more values for the MPP at a plurality of times over a second time period of use of a second calling list;

determine a monitored value for the MPP over the second time period exceeds the threshold value of the MPP; and in response to the monitored value for the MPP over the second time period exceeding the threshold value:
 terminate use of the second calling list;
 begin use of a third calling list; and
 have an outbound voice call originated using the third calling list.

8. The computer-readable, non-transitory medium of claim 7, wherein the instructions cause the processor to:
 use a calling window and a time zone associated with the first calling list to determine the threshold value.

9. The computer-readable, non-transitory medium of claim 7, wherein the instructions cause the processor to terminate use of the second calling list upon receiving a response from a computer used by an administrator indicating to terminate use of the second calling list.

10. The computer-readable, non-transitory medium of claim 7, wherein the first calling list and the second calling list comprise telephone numbers located in different time zones.

11. The computer-readable, non-transitory medium of claim 7, wherein an average value calculated from the plurality of values for the MPP is used to determine the threshold value.

12. The computer-readable, non-transitory medium of claim 7, wherein the MPP is identified based on a type of the calling campaign.

13. A method for scheduling a second calling list to be used by a dialer located in a contact center to originate outbound calls for a calling campaign, the method comprising:
 identifying a first calling list used by the dialer to originate the outbound calls;
 identifying a measured performance parameter ("MPP") associated with processing the first calling list, wherein the MPP is identified by a processor in the dialer processing the first calling list;
 analyzing recorded values for the MPP by the processor to determine a threshold value for terminating use of the first calling list, the recorded values for the MPP being recorded at a plurality of times during one or more past uses of the first calling list;
 monitoring values for the MPP associated with a current use of the first calling list by the processor;
 determining a monitored valued for the MPP associated with the current use of the first calling list exceeds the threshold value by the processor; and
 in response to determining the monitored value for the MPP associated with the current use of the first calling list exceeds the threshold value:
  having the dialer terminate use of the first calling list;
  scheduling the second calling list to be used by the dialer; and
  originating an outbound call by the dialer using the second calling list.

14. The method of claim 13, wherein the MPP is identified based on a type of the calling campaign.

15. The method of claim 13, wherein a calling window, a current time, and a time zone associated with the first calling list are used to determine the threshold value.

16. The method of claim 13, wherein the first calling list comprises numbers in a first time zone and the second calling list comprises numbers in a second time zone adjacent to the first time zone.

17. The method of claim 13, wherein monitoring the values for the MPP comprises monitoring the values for the MPP over a period of time comprising at least one week and each monitored value corresponds to at least one day in the at least one week.

18. The method of claim 13, wherein the threshold value is defined as an average of the recorded values for the MPP.

19. The method of claim 13, wherein having the dialer terminate use of the first calling list is performed based on a command made to terminate use of the first calling list and begin use of the second calling list.

20. The method of claim 19, wherein
 the command originated from an administrator.

* * * * *